(12) United States Patent
Kikuchi et al.

(10) Patent No.: US 11,372,307 B2
(45) Date of Patent: Jun. 28, 2022

(54) OPTICAL MODULATOR

(71) Applicant: Nippon Telegraph and Telephone Corporation, Tokyo (JP)

(72) Inventors: Nobuhiro Kikuchi, Musashino (JP); Eiichi Yamada, Musashino (JP); Josuke Ozaki, Musashino (JP); Yoshihiro Ogiso, Musashino (JP); Yuta Ueda, Musashino (JP); Shinsuke Nakano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/970,283

(22) PCT Filed: Mar. 6, 2019

(86) PCT No.: PCT/JP2019/008741
§ 371 (c)(1),
(2) Date: Aug. 14, 2020

(87) PCT Pub. No.: WO2019/176665
PCT Pub. Date: Sep. 19, 2019

(65) Prior Publication Data
US 2021/0080795 A1    Mar. 18, 2021

(30) Foreign Application Priority Data
Mar. 13, 2018    (JP) .............................. JP2018-045791

(51) Int. Cl.
*G02F 1/225*    (2006.01)
*G02F 1/01*    (2006.01)
*G02F 1/035*    (2006.01)

(52) U.S. Cl.
CPC .............. *G02F 1/2255* (2013.01); *G02F 1/01* (2013.01); *G02F 1/0121* (2013.01); *G02F 1/0356* (2013.01); *G02F 2201/122* (2013.01)

(58) Field of Classification Search
CPC .... G02F 1/2255; G02F 1/0121; G02F 1/0356; G02F 2201/122; G02F 1/01
(Continued)

(56) References Cited

U.S. PATENT DOCUMENTS

| 2003/0091258 | A1* | 5/2003 | Uesaka | G02F 1/0356 385/2 |
| 2010/0264845 | A1* | 10/2010 | Broitzman | F21V 23/005 315/294 |
| 2012/0301070 | A1 | 11/2012 | Shimizu | |

FOREIGN PATENT DOCUMENTS

| JP | 2009-116290 A | 5/2009 |
| JP | 2011-70026 A | 4/2011 |

OTHER PUBLICATIONS

Nobubiro Kikuchi et al., *80-GB/s Low-Driving-Voltage InP DQPSK Modulator with an n-p-i-n Structure*, IEEE Photonics Technology Letters, vol. 21, No. 12, Jun. 15, 2009, pp. 787-789.
Roger G. Walker, *High-Speed III-V Semiconductor Intensity Modulators*, IEEE Journal of Quantum Electronics, vol. 27, No. 3, Mar. 1991, pp. 654-667.

(Continued)

*Primary Examiner* — Michael P Mooney
(74) *Attorney, Agent, or Firm* — Workman Nydegger

(57) ABSTRACT

Provided is an optical modulator having an optical modulation high frequency line through which a high frequency electrical signal can be efficiently input to an optical modulation region and which is in a broadband. High frequency lines of an optical modulator, that is, an input high frequency line, an optical modulation high frequency line, and an output high frequency line have a line configuration in which each of the input high frequency line and the output high frequency line is divided into a plurality of segments, and adjacent segments of the plurality of the segments have (Continued)

different characteristic impedances and propagation constants. The input high frequency line and the output high frequency line may be implemented by changing a width or a thickness of a signal electrode formed on a dielectric forming a micro-strip line between adjacent segments. The characteristic impedances and the propagation constants may be changed by changing a dielectric constant of the dielectric instead of changing the width or the thickness of the signal electrode.

8 Claims, 19 Drawing Sheets

(58) Field of Classification Search
USPC .......................................................... 385/1–3
See application file for complete search history.

(56) References Cited

OTHER PUBLICATIONS

Robert Lewen et al., *Segmented Transmission-Line Electroabsorption Modulators*, Journal of Lightwave Technology, vol. 22, No. 1, Jan. 2004, pp. 172-179.

N. Wolf et al., *Electro-Optical Co-Design to Minimize Power Consumption of a 32 GBd Optical IQ-Transmitter Using InP MZ-Modulators*, $37^{th}$ IEEE Compound Semiconductor IC (CSIC) Symposium, Oct. 11, 2015, pp. 1-4.

S. H. Lin et al., *High-Throughput GaAs PIN Electrooptic Modulator with a 3-dB Bandwidth of 9.6 GHz at 1.3 μm*, Applied Optics, vol. 26, No. 9, 1987, pp. 1696-1700.

International Search Report and Written Opinion dated May 28, 2019, issued in PCT Application No. PCT/JP2019/008741, filed Mar. 6, 2019.

\* cited by examiner

OPTICAL MODULATOR

TECHNICAL FIELD

The present disclosure relates to an optical modulator that performs modulation with a high frequency modulation signal.

BACKGROUND ART

Optical communication systems have been required to have increased capacity due to a recent, great increase in data communication volume, and thus the integration and complexity of optical components that are used and acceleration of signal speed have progressed. For example, such optical components include an optical modulator.

In recent years, in order to increase transmission capacity, an optical I/Q modulator (for example, refer to the following Non-Patent Literature 1) based on a Mach-Zehnder (MZ) modulator that can be employed in multi-value modulation such as QPSK or 16QAM has been used.

FIG. 1 illustrates a configuration example of an optical I/Q modulator of the related art. An optical I/Q modulator 100 is provided with an optical circuit formed of MZ interferometers MZa and MZb disposed in parallel on an optical waveguide substrate 101, and an MZ interferometer MZc coupling the MZ interferometers MZa and MZb in parallel to each other. Electrodes including input high frequency lines 103, optical modulation high frequency lines 104, and output high frequency lines 105 are further formed on the optical waveguide substrate 101. The optical modulation high frequency lines 104 include a signal electrode formed on each arm of the MZ interferometers MZa and MZb and ground electrodes formed on both sides of the signal electrode. A driver IC 102 for modulator driving that generates high frequency electrical signals, and termination resistors 106 are respectively coupled to the input high frequency lines 103 and the output high frequency lines 105.

A high frequency electrical signal generated by the driver IC 102 is input to the optical modulation high frequency line 104 formed in an optical modulation region via the input high frequency line 103, and applies modulation to an optical signal due to an electrooptic (EO) effect in the optical modulation high frequency line 104. The high frequency electrical signal transmitted through the optical modulation high frequency line 104 is terminated in the termination resistor 106 via the output high frequency line 105.

In the optical I/Q modulator 100, for example, an optical modulation signal of 100 Gbit/s or more is generated, and thus a high speed and high frequency electrical signal at a symbol rate of several tens of Gbaud is input to each MZ modulator in a chip. In order to handle such a signal having a considerably high frequency, the optical I/Q modulator 100 is required to be operated in an EO band that is a broadband in order to generate a high quality optical signal.

Regarding band widening, employing a traveling wave electrode is known as an effective method. In design of the traveling wave electrode, it is important that propagation losses of the optical modulation high frequency line 104 are small, and 50Ω impedance matching and matching between electricity and light are achieved.

As one method of forming the optical modulation high frequency line 104 with small propagation loss, a wiring resistance may be reduced by increasing a cross-sectional area of a wiring electrode. However, this reduces impedance and increases a phase velocity of electricity, and, thus, in such a design with emphasis on a propagation loss reduction, impedance mismatching or velocity mismatching occurs in some cases. In a case where impedance mismatching occurs, a high frequency electrical signal output from the driver IC 102 cannot be efficiently input to an optical modulator, and thus a waveform deteriorates due to the influence of reflection. In a case where the velocity mismatching is considerable, optical modulation efficiency also deteriorates.

Thus, there is a need for a broadband optical modulation high frequency line with which impedance matching or velocity matching can be realized to a great degree. As the optical modulation high frequency line, there is a traveling wave line (refer to Non-Patent Literature 2) loaded with capacitance or a segmented traveling wave line (refer to Non-Patent Literature 3). The optical modulation high frequency line is designed such that each segment has a predetermined impedance, and a plurality of segments are repeated, and thereby forming a uniform impedance line.

However, the optical modulation high frequency line of the related art is configured to be partially coupled to a waveguide providing optical modulation, and thus has a problem that a modulation factor per unit length is low.

In recent years, as a method of coupling a driver IC to an optical modulator, an open drain configuration or an open collector configuration has been proposed (refer to Non-Patent Literature 4). In this configuration, an impedance matching condition from the driver IC to the modulator is relaxed, and a high frequency electrical signal can be efficiently input to the optical modulator having any impedance within a certain range, and thus the configuration has a feature of achieving low power consumption.

However, in the open drain configuration or the open collector configuration, an output impedance, that is an impedance from the modulator to the driver IC, appears infinite. Thus, in a case where a reflection point due to impedance mismatching is present after an input high frequency line, multiple reflection occurs between the reflection point due to the impedance mismatching, and a coupling point between the driver IC and the optical modulator. As a result, a waveform may deteriorate depending on cases.

CITATION LIST

Non Patent Literature

Non-Patent Literature 1: Nobuhiro Kikuchi, et al., "80-Gb/s Low-Driving-Voltage InP DQPSK Modulator With an n-p-i-n Structure", IEEE PHOTONICS TECHNOLOGY LETTERS, VOL. 21, NO. 12, Jun. 15, 2009, pp. 787 to 789

Non-Patent Literature 2: Robert G. Walker, "High-speed III-V Semiconductor Intensity Modulators", IEEE JOURNAL OF QUANTUM ELECTRONICS, VOL. 27, NO. 3, MARCH 1991, pp. 654 to 667

Non-Patent Literature 3: Robert Lewen, et al., "Segmented Transmission-Line Electroabsorption Modulators", Journal of Lightwave Technology, vol. 22, No. 1, January 2004, pp. 172 to 179

Non-Patent Literature 4: N. Wolf, et al., "Electro-Optical Co-Design to Minimize Power Consumption of a 32 GBd Optical IQ-Transmitter Using InP MZ-Modulators", 37th IEEE COMPOUND SEMICONDUCTOR IC (CSIC) SYMPOSIUM, 2015

Non-Patent Literature 5: S. H. Lin, et al., "High-throughput GaAs PIN electrooptic modulator with a 3-dB bandwidth of 9.6 GHz at 1.3 GHz", Applied Optics, Vol. 26, No. 9, May 1987, pp. 1696 to 1700

SUMMARY OF THE INVENTION

Technical Problem

An EO modulation factor of a traveling wave electrode type optical modulator is defined depending on a length of an optical modulation region, impedance, a propagation constant of electricity, and group velocity of light as described in Non-Patent Literature 5. An EO band being a broadband indicates that the EO modulation factor does not depend on a frequency much, and the decrease in the modulation factor on a high frequency side is small.

In order for a high frequency electrical signal from the driver IC to be efficiently input to an optical modulation region, it is necessary to achieve impedance matching on an input side of the optical modulator. FIG. 2 illustrates an equivalent circuit of one high frequency line of the optical modulator illustrated in FIG. 1, and $Z_S$, $Z_a$, $Z_{MZ}$, $Z_b$, and $Z_L$ respectively indicate impedances of an input end, the input high frequency line 103, the optical modulation high frequency line 104 of the MZ modulator portion, the output high frequency line 105, and the termination resistor 106. The impedance $Z_S$ is typically 50Ω, and, thus, generally, the impedances $Z_a$, $Z_{MZ}$, $Z_b$, and $Z_L$ are all designed to be matched with 50Ω.

However, there is a case where impedance matching cannot be completely achieved due to a design or structure restriction, and in this case, a high frequency electrical signal that is input from the driver IC 102 is subjected to reflection corresponding to an impedance difference at each coupling point, and is finally terminated in the termination resistor 106.

For example, in a traveling wave electrode type optical modulator using a semiconductor material, a slightly low impedance may be set in light of modulation efficiency and propagation losses of an optical modulation high frequency line. Here, FIG. 3 and FIG. 4 are cross-sectional views illustrating examples of lines of the traveling wave electrode type semiconductor optical modulator. FIG. 3 illustrates configurations of the input high frequency line 103 employing a micro-strip line, and the output high frequency line 105, and FIG. 4 illustrates a configuration of the optical modulation high frequency line 104. Each of the input high frequency line 103 and the output high frequency line 105 has a structure in which a ground electrode 302, a dielectric 303, and a signal electrode 304 are laminated in this order on an optical waveguide substrate 301. The optical modulation high frequency line 104 has a structure in which a lower clad layer 402, a core layer 404, and an upper clad layer 405 are laminated in this order on an optical waveguide substrate 401 such that a ridge type waveguide is formed, and a ground electrode 403 and a signal electrode 406 are respectively formed on the lower clad layer 402 and the upper clad layer 405.

FIG. 5 shows the impedances $Z_S$, $Z_a$, $Z_{MZ}$, $Z_b$, and $Z_L$ of the input end, the input high frequency line 103, the optical modulation high frequency line 104 of the MZ modulator portion, the output high frequency line 105, and the termination resistor 106 in the traveling wave electrode type semiconductor optical modulator employing the line configurations illustrated in FIG. 3 and FIG. 4. The impedance $Z_S$ of the input end and the impedance $Z_a$ of the input high frequency line 103 are 50Ω, and, in order to reduce propagation losses of the optical modulation region, impedances of lines subsequent to the optical modulation high frequency line 104, that is, the impedance $Z_{MZ}$ of the optical modulation high frequency line 104, the impedance $Z_b$ of the output high frequency line 105, and the impedance $Z_L$ of the termination resistor 106 are set to 30Ω. The impedance of each portion is realized by appropriately setting a width of the signal electrode.

FIG. 6 shows a transmission characteristic S21 and a reflection characteristic S11 by using an S parameter that is computed in relation to the traveling wave electrode type semiconductor optical modulator illustrated in FIG. 3 to FIG. 5. FIG. 7 shows an EO response to a frequency computed in relation to the traveling wave electrode type semiconductor optical modulator illustrated in FIG. 3 to FIG. 5. The computation result in FIG. 6 shows that the reflection characteristic S11 is reduced to about −10 dB due to impedance mismatching occurring at an interface between the input high frequency line 103 and the optical modulation high frequency line 104. This indicates that a high frequency electrical signal from the driver IC 102 is not efficiently input to the optical modulation region, and the EO band does not sufficiently extend, and there is also a problem from the viewpoint of suppression of waveform deterioration due to signal return to the driver IC 102.

The present disclosure has been made in light of the problem, and an object of the present disclosure is to provide an optical modulator having an optical modulation high frequency line through which a high frequency electrical signal can be efficiently input to an optical modulation region and which is in a broadband.

Means for Solving the Problem

In order to solve the problem, according to the present disclosure, there is provided an optical modulator including high frequency lines including an optical modulation high frequency line that is formed to provide an electrooptic effect to an electrical signal propagating through an optical waveguide, and an input high frequency line and an output high frequency line that are coupled to the optical modulation high frequency line, wherein at least one of the optical modulation high frequency line, the input high frequency line, or the output high frequency line is divided into a plurality of segments, and adjacent segments within the plurality of the segments are designed to have different characteristic impedances and propagation constants from each other such that an EO band in the optical modulation high frequency line is greater than an EO band in an optical modulation high frequency line in a case where characteristic impedances and propagation constants of the plurality of segments are uniform.

In another embodiment, there is provided an optical modulator including high frequency lines including an optical modulation high frequency line that is formed to provide an electrooptic effect to an electrical signal propagating through an optical waveguide, and an input high frequency line and an output high frequency line that are coupled to the optical modulation high frequency line, wherein at least one of the optical modulation high frequency line, the input high frequency line, or the output high frequency line is divided into a plurality of segments, and adjacent segments within the plurality of segments are designed to have different characteristic impedances and propagation constants from each other such that a reflection characteristic in an input end of the input high frequency line is smaller than a reflection characteristic in an input end of an input high frequency line in a case where characteristic impedances and propagation constants of the plurality of segments are uniform.

In yet another embodiment, the high frequency line divided into the plurality of segments is designed such that at least one of a width or a thickness of a signal line of the high frequency line differs between adjacent segments within the plurality of the segments.

In yet another embodiment, the high frequency line divided into the plurality of segments is designed such that an inter-electrode distance between a signal electrode and a ground electrode differs between adjacent segments within the plurality of the segments.

In yet another embodiment, the high frequency line divided into the plurality of segments is designed such that a dielectric constant of a dielectric between a signal electrode and a ground electrode differs between adjacent segments within the plurality of the segments.

Effects of the Invention

According to the present disclosure, it is possible to realize an optical modulator that is used for large-capacity optical communication, can be operated at a high speed, and is highly efficient.

DESCRIPTION OF EMBODIMENTS

Figure 1:
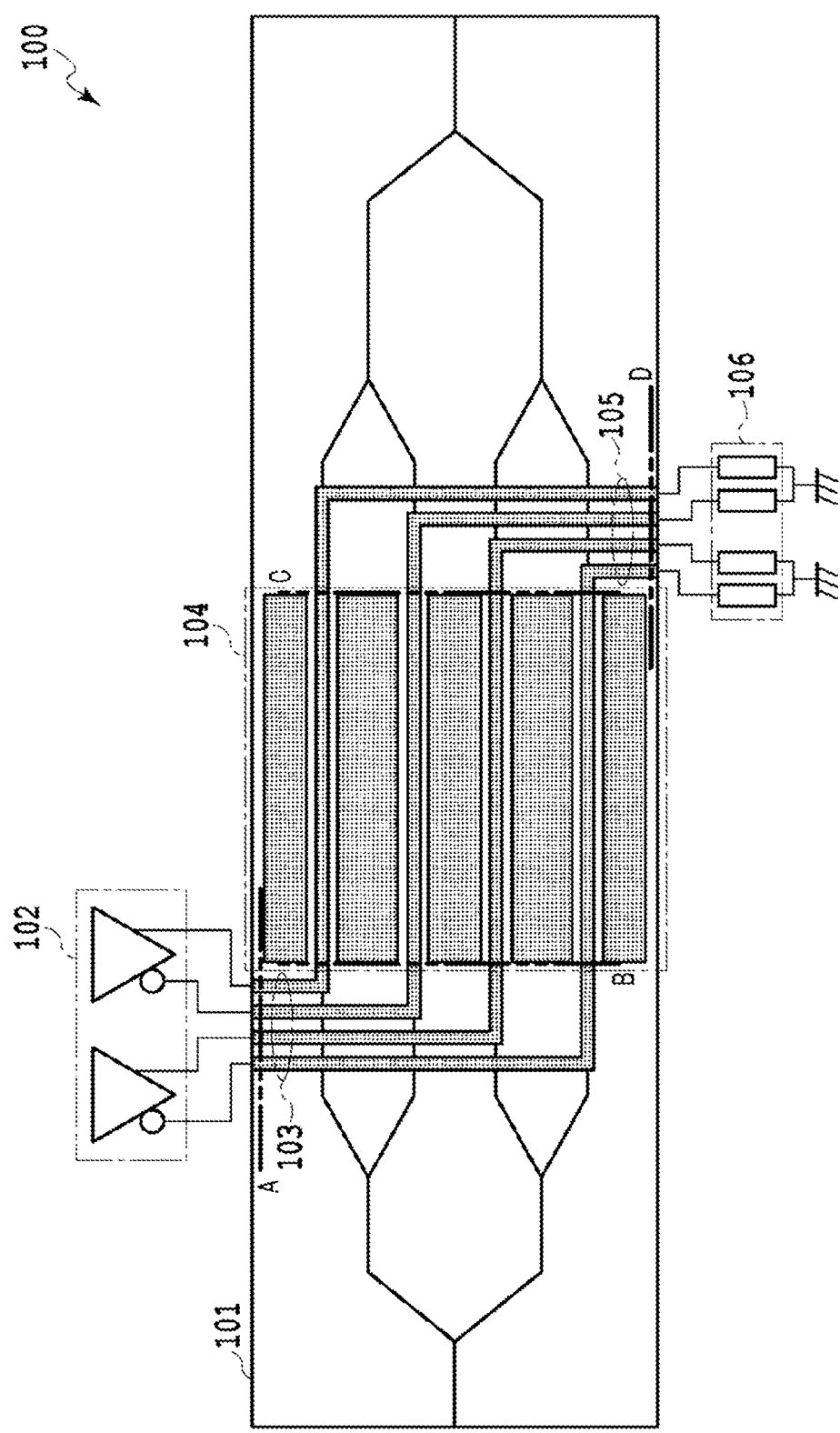
FIG. 1 is a diagram illustrating a configuration example of an optical I/Q modulator of the related art.
Figure 2:
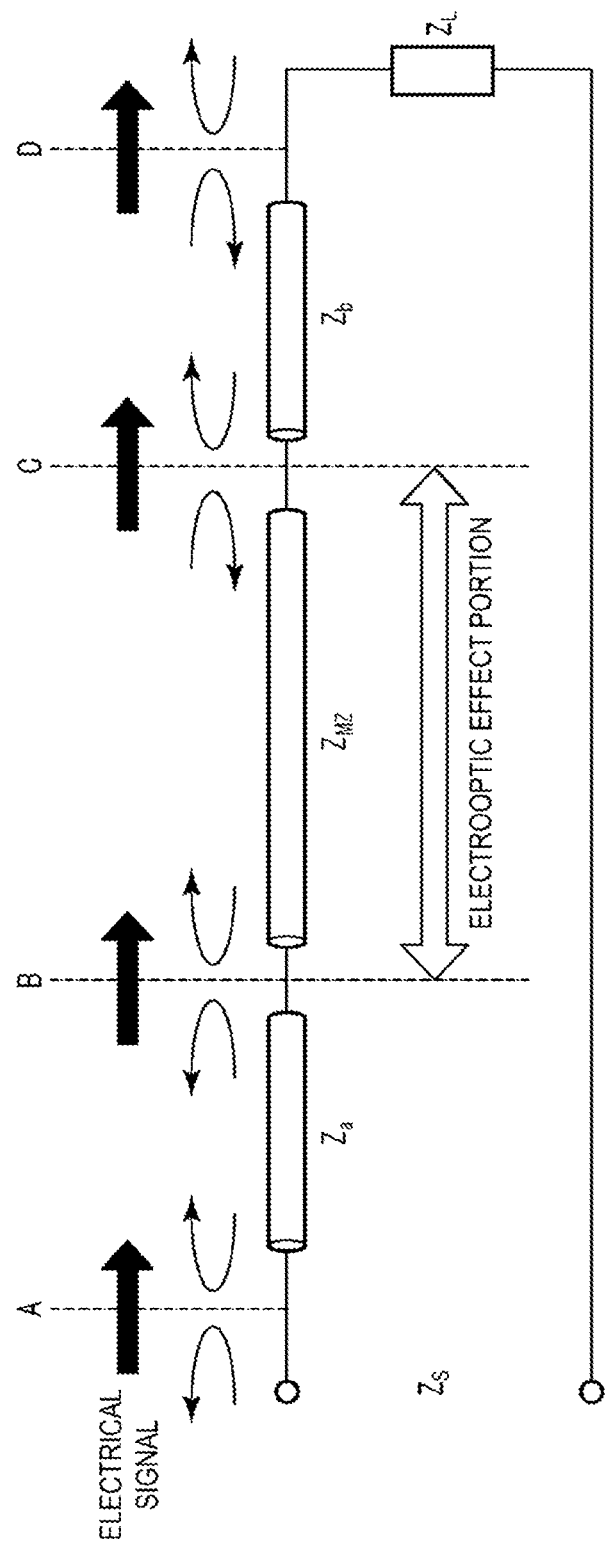
FIG. 2 is a diagram illustrating an equivalent circuit of one high frequency line of the optical modulator illustrated in FIG. 1.

Hereinafter, with reference to the drawings, embodiments of the present disclosure will be described by exemplifying the semiconductor optical modulator illustrated in FIG. 1.

First Embodiment

Figure 3:
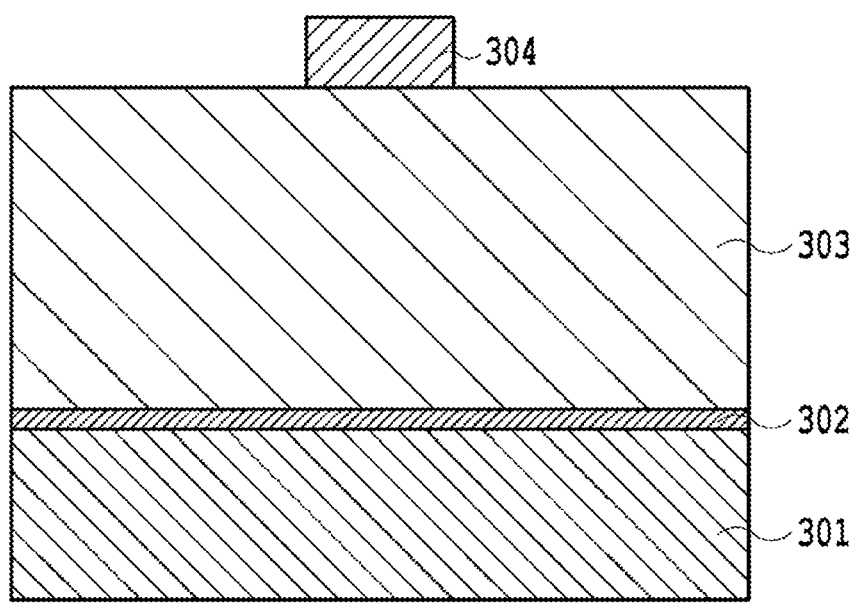
FIG. 3 is a diagram illustrating a configuration of an input high frequency line employing a micro-strip line and an output high frequency line in a traveling wave electrode type optical modulator.
Figure 4:
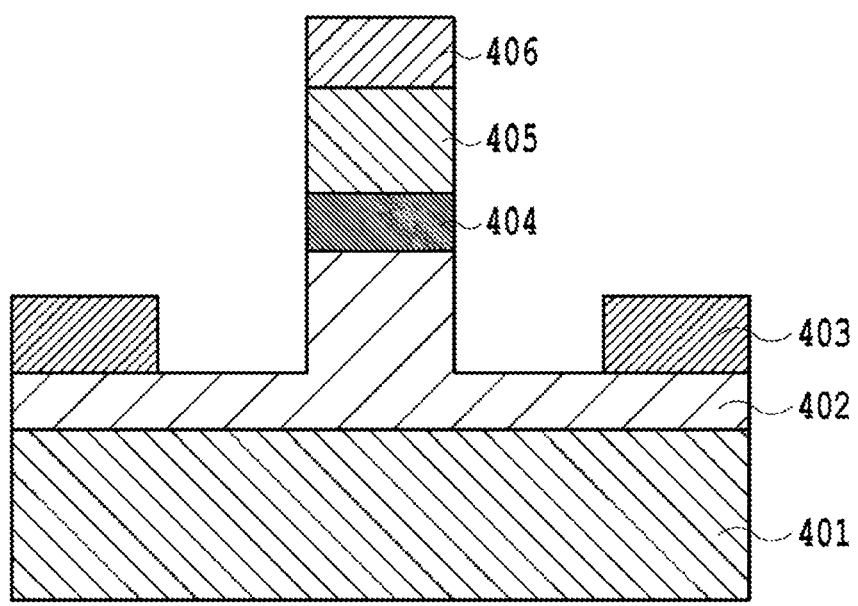
FIG. 4 is a diagram illustrating a configuration of an optical modulation high frequency line of the traveling wave electrode type optical modulator.
Figure 5:
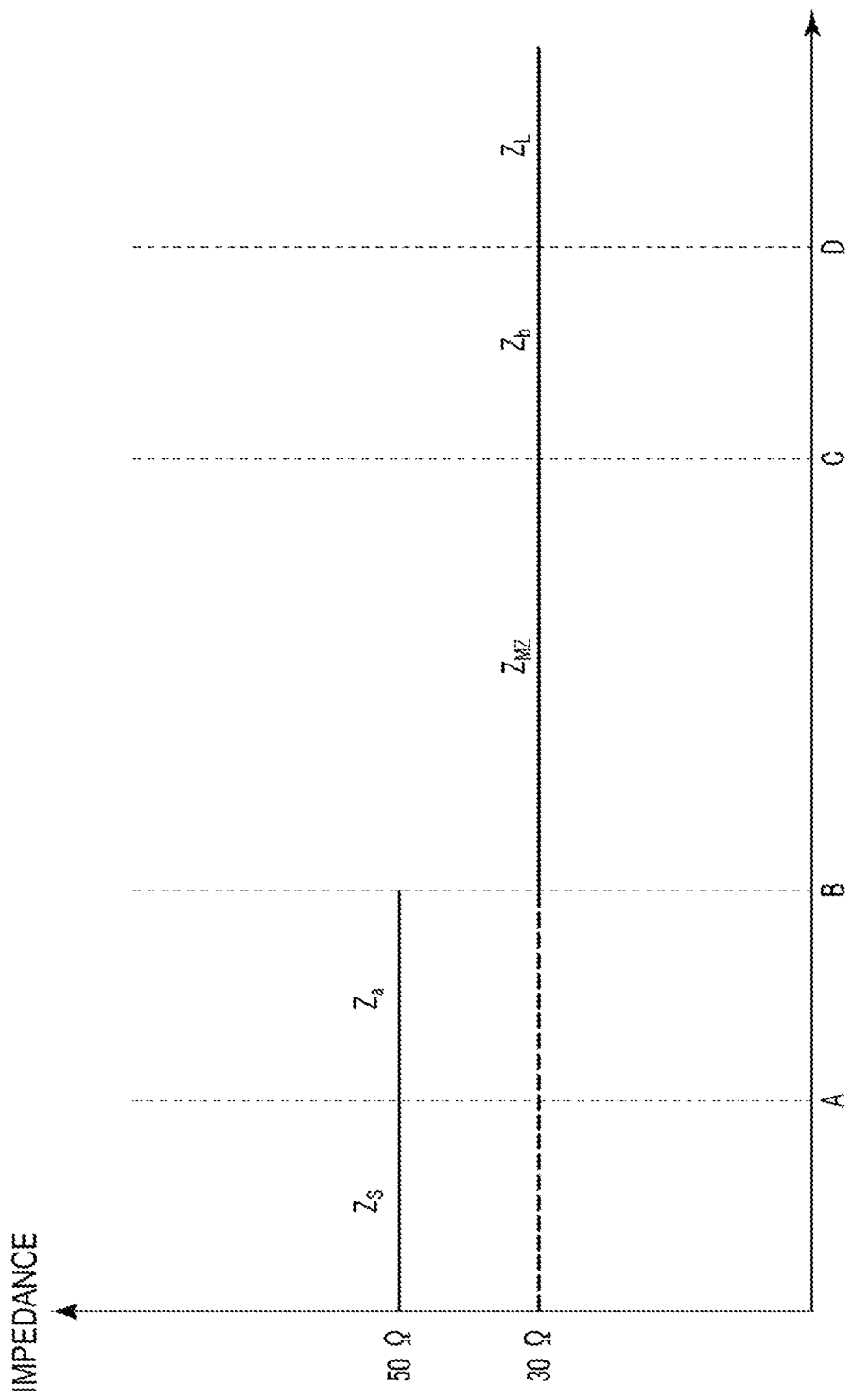
FIG. 5 is a graph showing impedances $Z_S$, $Z_a$, $Z_{MZ}$, $Z_b$, and $Z_L$ of an input end, an input high frequency line, an optical modulation high frequency line of an MZ modulator portion, an output high frequency line, and a termination resistor in the traveling wave electrode type semiconductor optical modulator illustrated in FIGS. 3 to 5.
Figure 6:
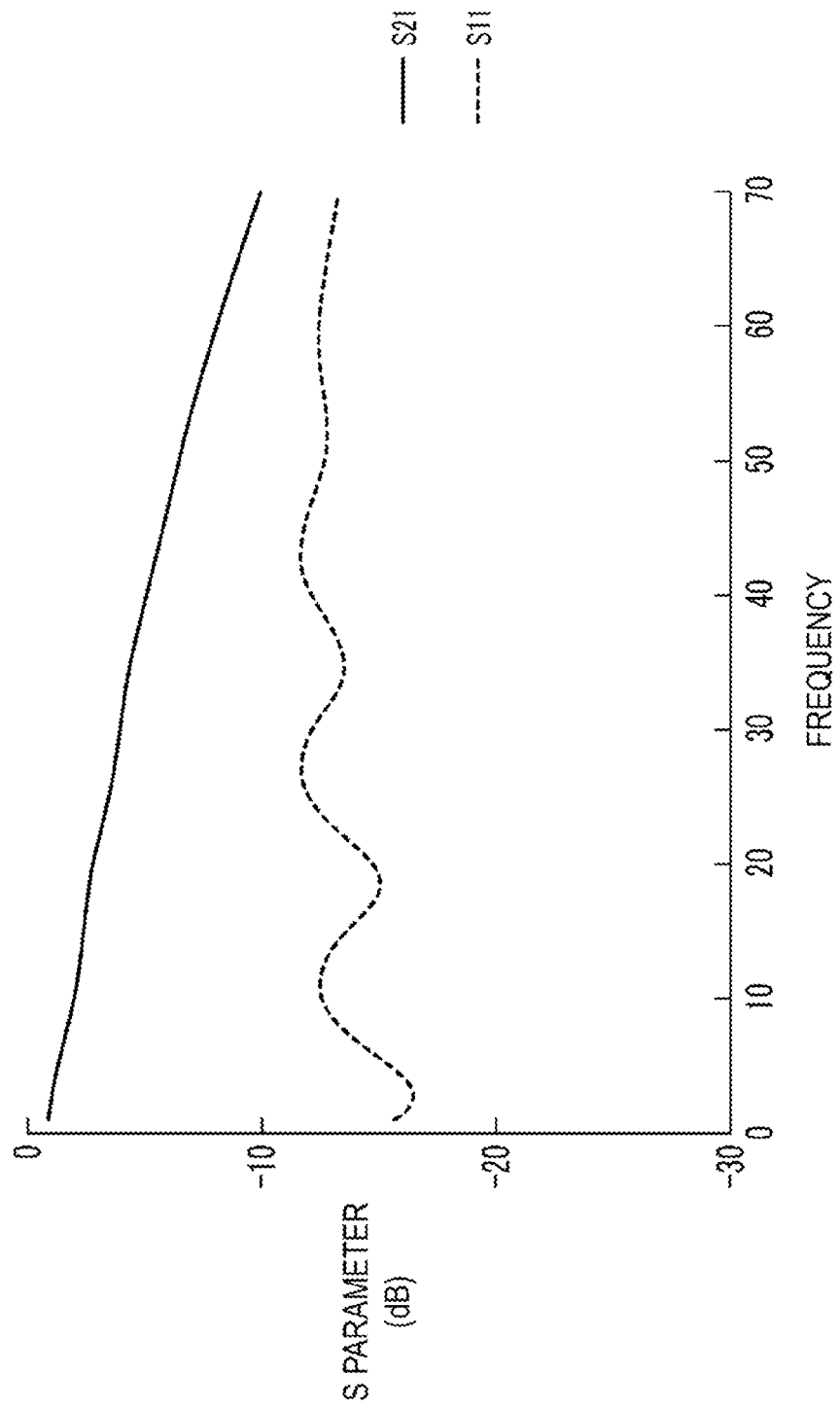
FIG. 6 is a graph showing a transmission characteristic S21 and a reflection characteristic S11 as an S parameter that is computed in relation to the traveling wave electrode type semiconductor optical modulator illustrated in FIGS. 3 to 5.
Figure 7:
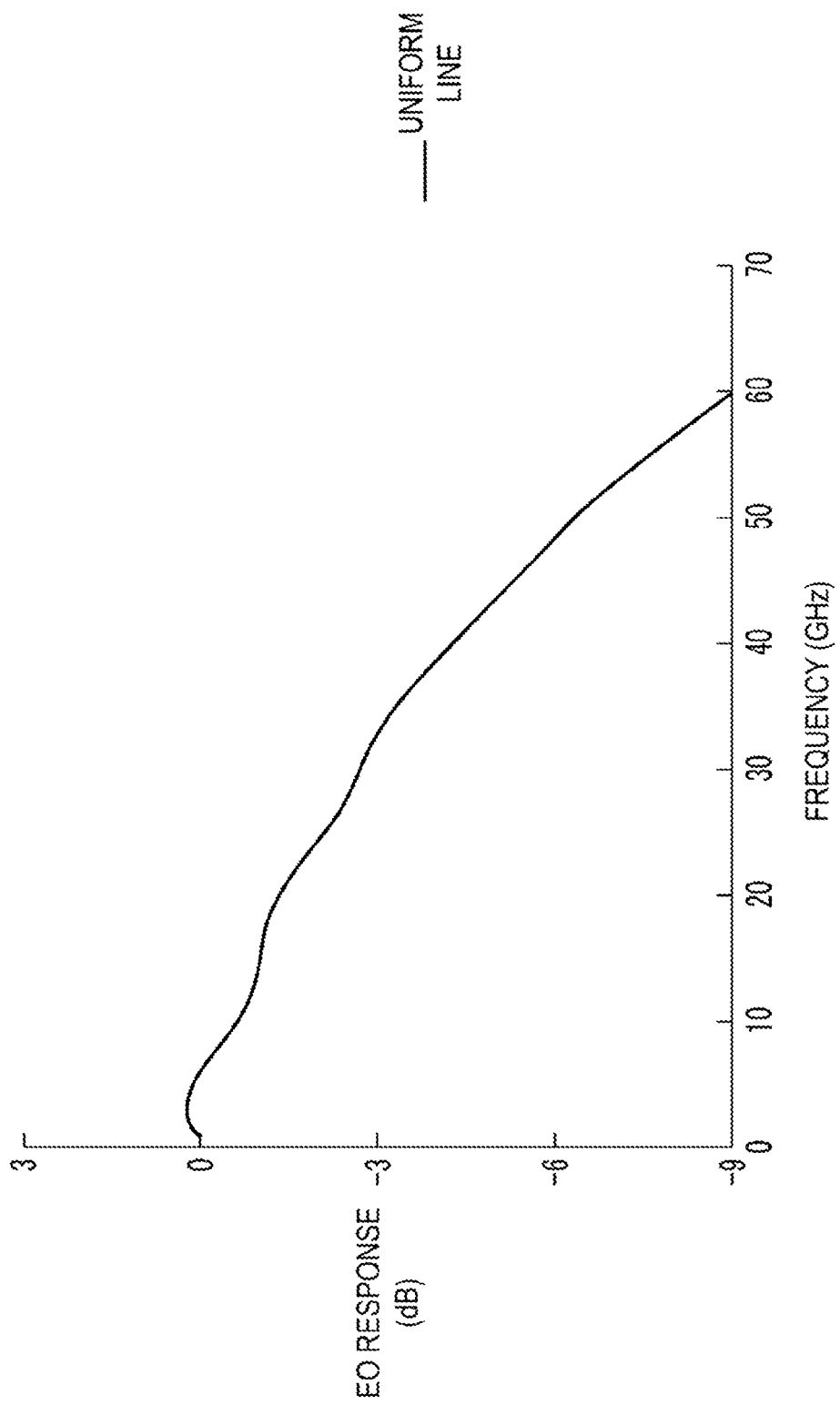
FIG. 7 is a graph showing an EO response to a frequency, computed in relation to the traveling wave electrode type semiconductor optical modulator illustrated in FIG. 3 to FIG. 5.

An input high frequency line and an output high frequency line according to the present embodiment are micro-strip lines, and each of the micro-strip lines has a fundamental configuration in which the ground electrode 302, the dielectric layer 303, and the signal electrode 304 are laminated in this order on the SI—InP substrate 301 as in the cross-sectional view of FIG. 3. An optical modulation high frequency line has a configuration in which the n-InP clad layer 402, the non-doped semiconductor core layer 404 functioning as an optical waveguide layer, and the p-InP clad layer 405 are laminated in this order on the SI—InP substrate 401 as in the cross-sectional view of FIG. 4. A high mesa waveguide structure is used as an optical waveguide structure, and, in order to apply a voltage to the semiconductor core layer 404, the signal electrode 406 and the ground electrode 403 are respectively provided on the n-InP clad layer 402 and the p-InP clad layer 405. In a case where a negative voltage (reverse bias) is applied between the electrodes, a refractive index change occurs due to the electrooptic effect in the semiconductor core layer 404, and thus a phase of light can be changed, that is, the light can be modulated.

The semiconductor core layer 404 may be formed of a bulk layer of quaternary mixed crystal or a multiple-quantum well layer having a single composition by using materials such as InGaAsP or InGaAlAs. The semiconductor core layer 404 may have a structure in which light confinement layers of which a bandgap is larger than that of a multiple-quantum well layer and is smaller than that of an InP layer are provided on and under the multiple-quantum well layer. Non-doped InP layers may be inserted into upper and lower parts of such a semiconductor core layer 404. A bandgap wavelength of the bulk layer of quaternary mixed crystal or the multiple-quantum well layer is set such that the electrooptic effect effectively acts in an optical wavelength that is used and light absorption is not problematic.

Figure 8:
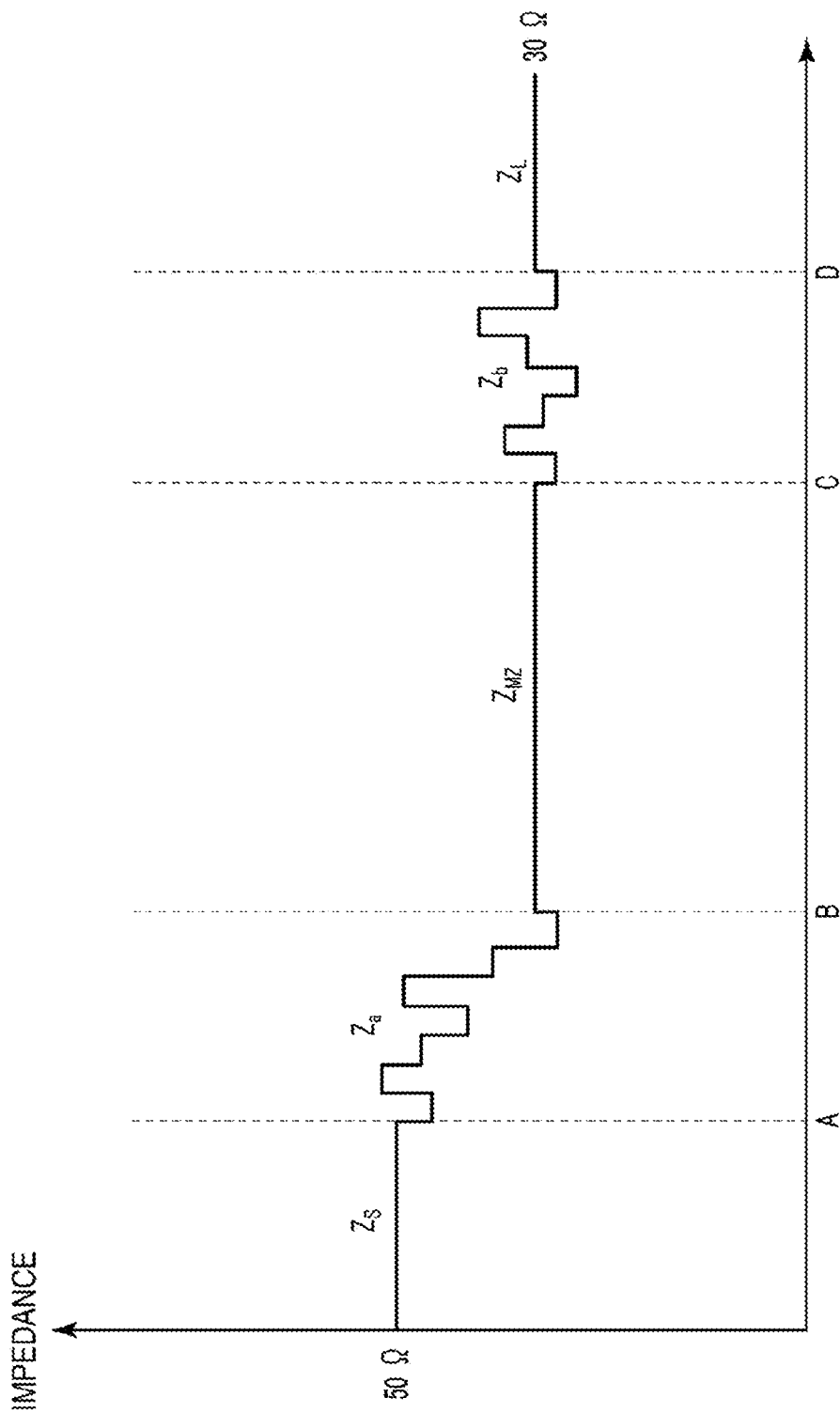
FIG. 8 is a graph showing a characteristic impedance of a high frequency line of an optical modulator according to a first embodiment of the present disclosure.
Figure 9:
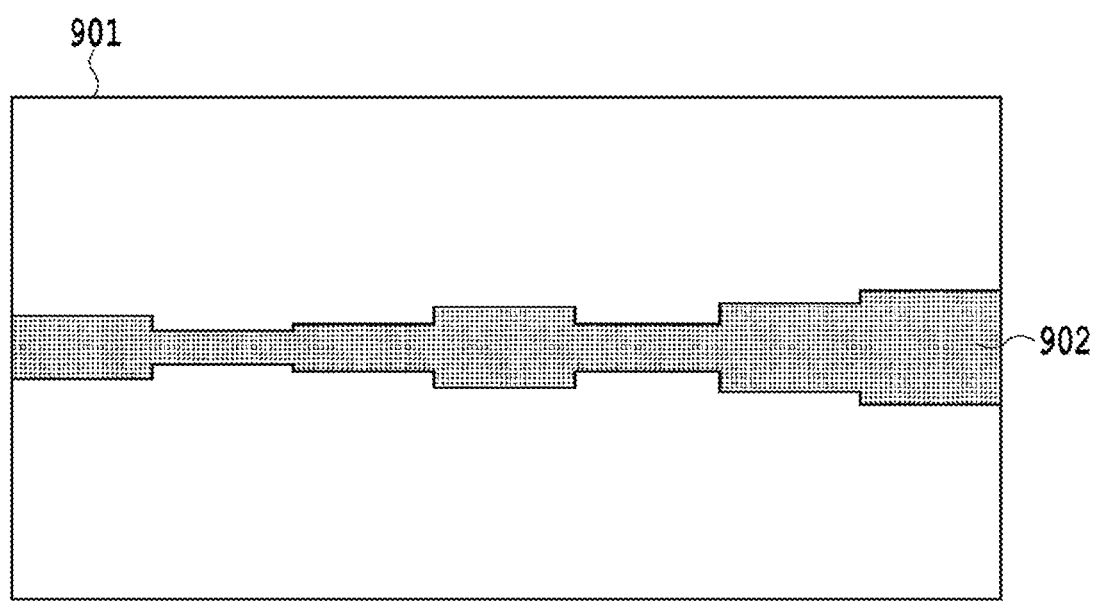
FIG. 9 is a top view illustrating an input high frequency line and an output high frequency line of the optical modulator according to the first embodiment of the present disclosure.

FIG. 8 is a graph showing a characteristic impedance of a high frequency line of an optical modulator according to the first embodiment of the present disclosure. The high frequency lines of the optical modulator as illustrated in FIG. 1, that is, the input high frequency line (A-B), the optical modulation high frequency line (B-C), and the output high frequency line (C-D) are characterized to have a line configuration in which each of the input high frequency line (A-B) and the output high frequency line (C-D) is divided into a plurality of segments, and adjacent segments of the plurality of the segments have different characteristic impedances and propagation constants. The input high frequency line and the output high frequency line may be implemented, for example, as illustrated in FIG. 9, by changing a width or a thickness of a signal electrode 902 formed on a dielectric 901 forming a micro-strip line between adjacent segments. The characteristic impedances and the propagation constants may be changed by changing a dielectric constant of the dielectric 901 instead of changing the width or the thickness of the signal electrode 902. In the examples illustrated in FIG. 8 and FIG. 9, the high frequency line is divided into seven segments.

In this configuration, a high frequency signal that is input from the input end generates a reflected wave while changing its reflection amount depending on an impedance difference at an impedance discontinuous point from the input high frequency line 103 to the termination resistor 106. The reflected wave is subjected to multiple reflections to be generated reflected waves depending on cases, the reflected waves overlap or cancel out each other, or are combined with traveling waves. A combined high frequency signal applies modulation to an optical signal due to the electrooptic effect in the optical modulation region. Consequently, in a case where generation of the reflected waves is optimally designed, and a combined harmonic signal is maintained at a higher voltage in the optical modulation region at each frequency such that a higher modulation factor is obtained, it is possible to implement an optical modulator with high modulation efficiency in a broadband.

However, it is hard to obtain the optimal design through analysis. Consequently, in the following Example of the present disclosure, a line configuration realizing a high reflection suppression effect was found by using a genetic algorithm. Specifically, a total length of the input high frequency line 103 and the output high frequency line 105 of the optical I/Q modulator illustrated in FIG. 1 was 1.5 mm, a length of the optical modulation high frequency line 104 was 3.0 mm, and a length of a unit segment of the input high frequency line 103 and the output high frequency line 105 was 100 μm. The impedance $Z_S$ of the input end was 50Ω, and each of the impedance $Z_{MZ}$ of the optical modulation high frequency line and the impedance $Z_L$ of the termination resistor was fixed to 30Ω. On the other hand, impedances of the input high frequency line 103 and the output high frequency line 105 were set to 18 values between 30Ω to 75Ω by changing a signal electrode width of a micro-strip. A propagation constant is uniquely defined in accordance with an impedance defined by the structure.

Optimization procedures are as follows. First, for example, 100 individuals are created by using an array of sets of impedances and propagation constants of the input high frequency line 103 and the output high frequency line 105 divided into 15 segments according to random numbers. This is set as a first generation individual group. Next, two individuals are selected according to random numbers, and segments determined according to random numbers are replaced with an array of the individuals (chiasma). Impedances and propagation constants of segments corresponding to any set probability are replaced with original 18 sets of impedances and propagation constants (mutation). This is repeatedly performed 50 times, and thus new 100 individuals may be generated. An S parameter and an EO band of the whole optical modulator for the new 100 individuals are computed, and evaluation values are calculated.

Herein, the evaluation value was set to a sum total of a reflection amount of S11 at each frequency and a deviation amount from 0 dB (modulation factor of 100%) of an EO response at all frequencies. In other words, as the evaluation value becomes smaller, reflection viewed from the input end is reduced, and an EO characteristic becomes flatter with respect to a frequency such that an EO band increases.

Next, three individuals are selected from a group of the new 100 individuals according to random numbers, and an individual having the smallest evaluation value is selected and is set as a second generation individual. This is repeatedly performed 100 times, and thus a group of 100 second generation individuals. This procedure is repeatedly performed a predetermined number of times, and each generation becomes an individual group that is more suitable for an environment (an EO band is broad). An array having the smallest evaluation value in the last generation is obtained as an optimal solution.

Figure 10:
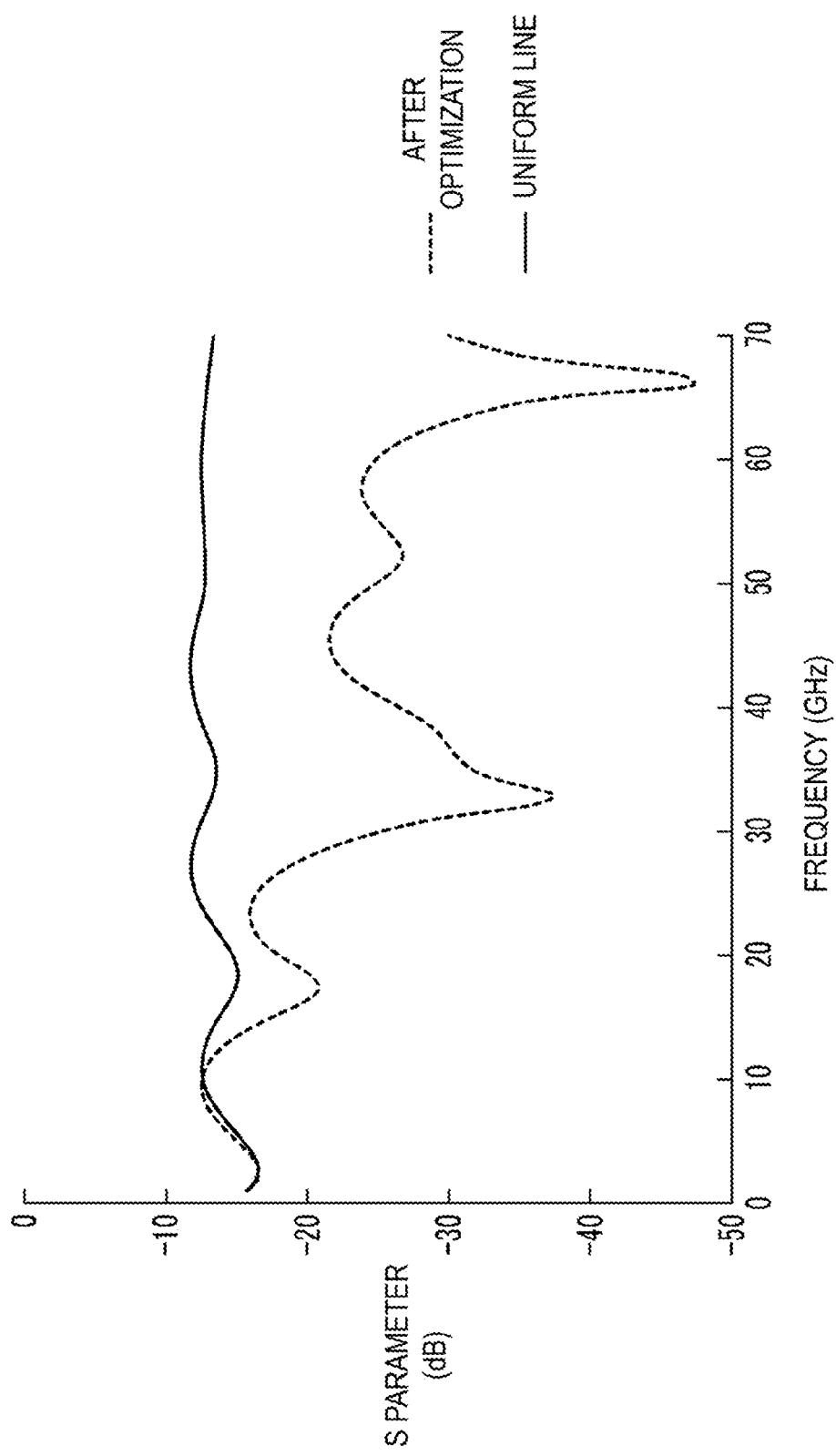
FIG. 10 is a graph showing an S parameter of an optimal solution that is consequently obtained for the high frequency line of the optical modulator according to the first embodiment of the present disclosure.
Figure 11:
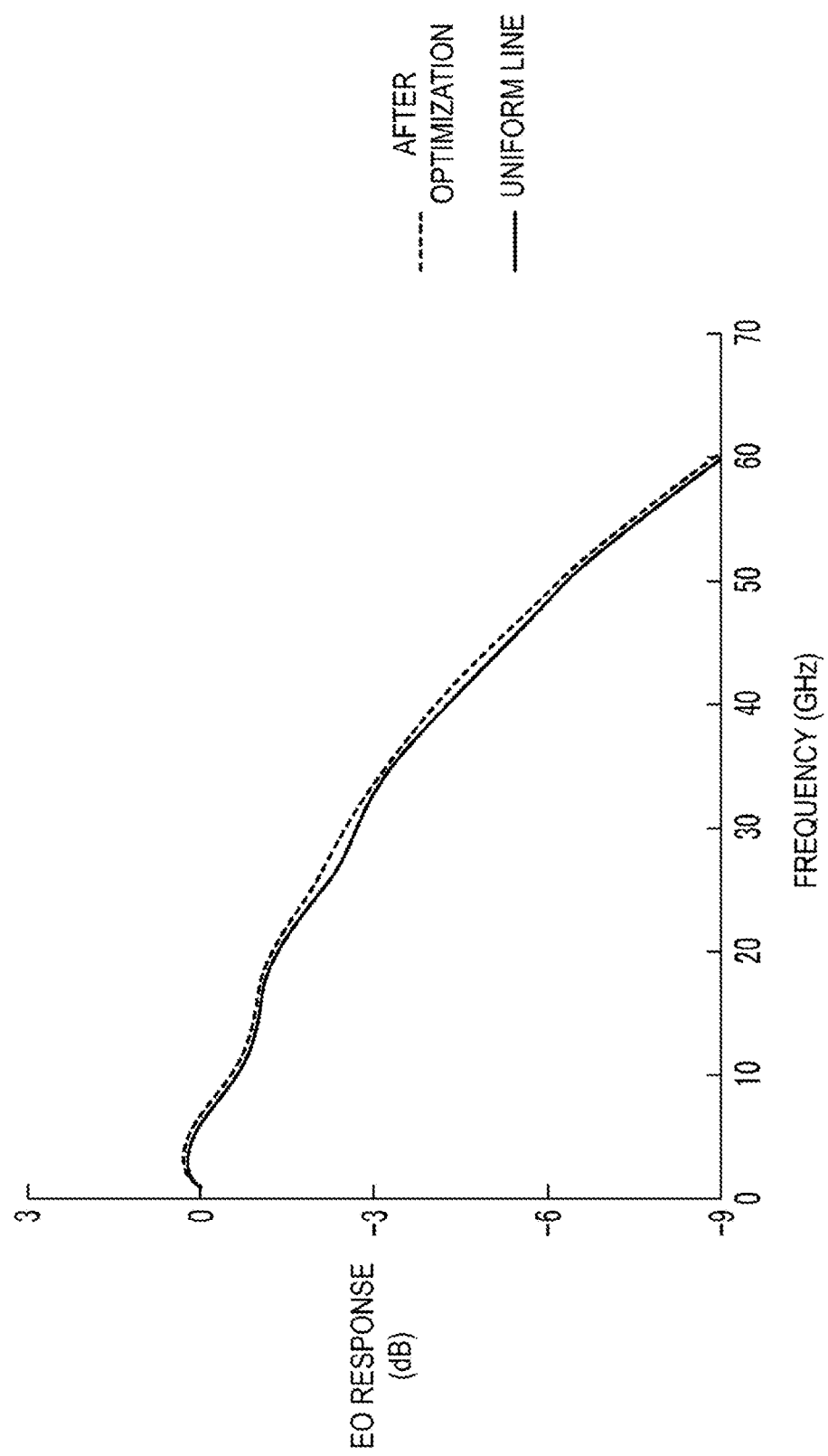
FIG. 11 is a graph showing an EO response of an optimal solution that is consequently obtained for a high frequency line of the optical modulator according to the first embodiment of the present disclosure.

FIG. 10 and FIG. 11 respectively show an S parameter and an EO response of an optimal solution consequently obtained for the high frequency line of the optical modulator according to the first embodiment of the present disclosure. For reference, an S parameter and an EO response in a line having a uniform width described in the related art are plotted together for comparison. As illustrated in FIG. 10, in the present disclosure, reflection is remarkably suppressed on the high frequency side. Consequently, a high frequency signal from the driver IC 102 can be efficiently input. An EO band can also be smoothly realized due to the reflection suppression effect.

Figure 12:
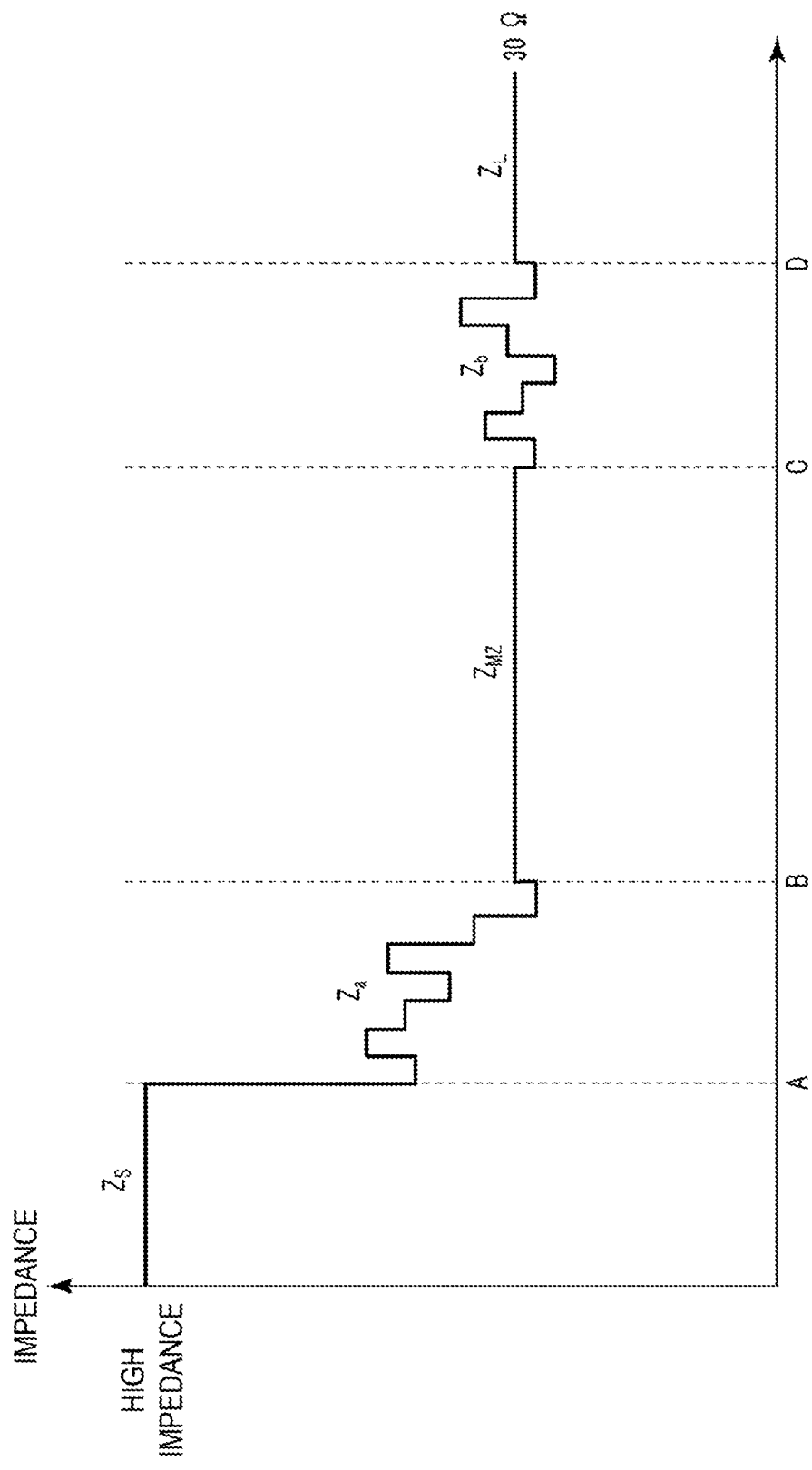
FIG. 12 is a graph showing a characteristic impedance of the high frequency line of the optical modulator employing an open drain coupling configuration or an open collector coupling configuration in coupling between a driver IC and an optical I/Q modulator according to the first embodiment of the present disclosure.

Another example of the first embodiment of the present disclosure, FIG. 12 shows a characteristic impedance of the high frequency line of the optical modulator employing an open drain coupling configuration or an open collector coupling configuration in coupling between a driver IC and an optical I/Q modulator. As described above, in the present configuration, when the driver IC 102 is viewed from the modulator side, a high impedance is viewed. The impedance $Z_S$ of the input end was set to 1000Ω this time, and computation was performed. The other parameters are the same as the parameters. An evaluation value was set to a sum total of a deviation amount from 0 dB (modulation factor of 100%) of an EO response at all frequencies. FIG. 12 illustrates an example in which the high frequency line is divided into 7 segments, but the following Example relates to an example in which the high frequency line is divided into 15 segments.

Figure 13:
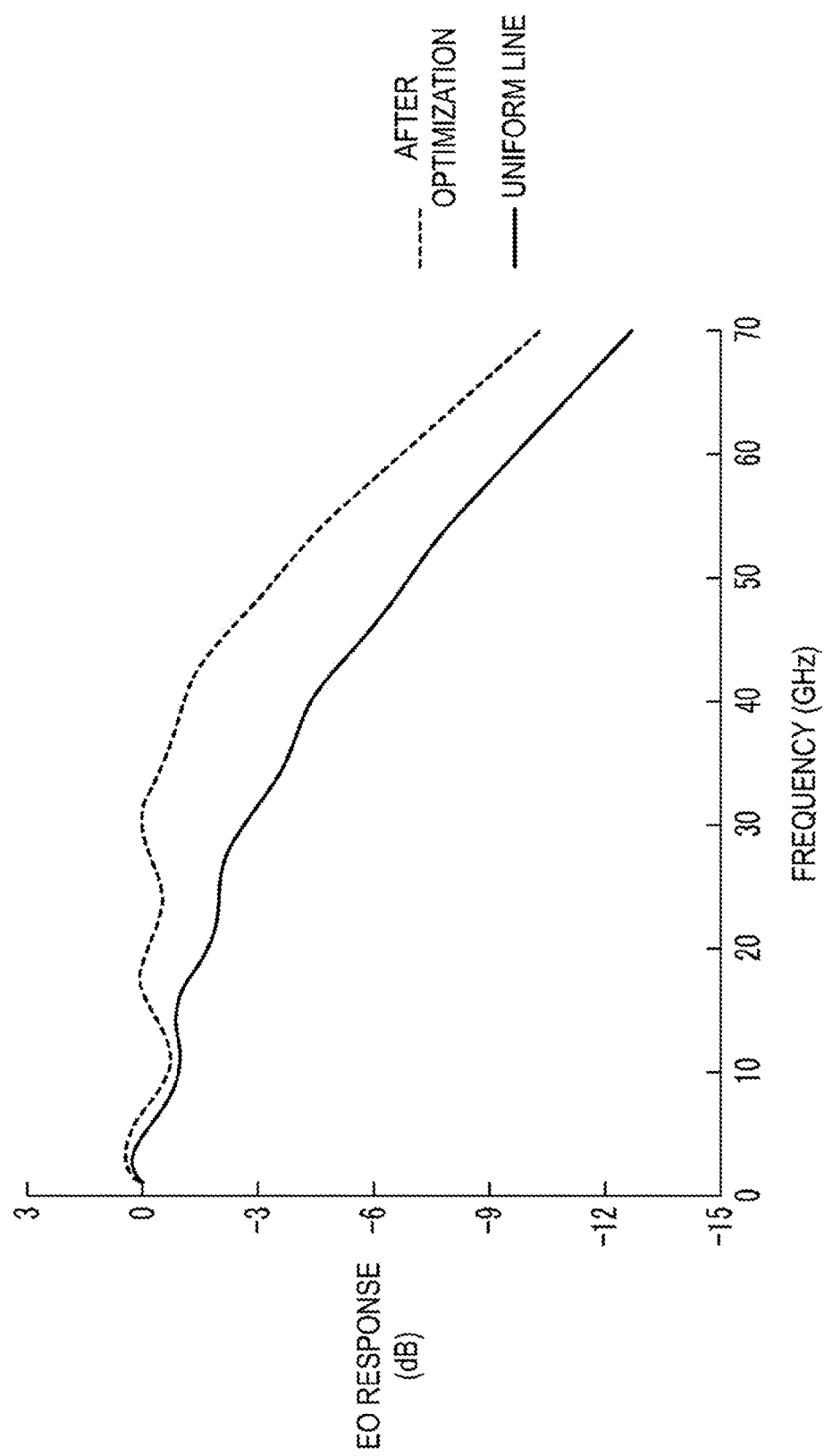
FIG. 13 is a graph showing an EO response of an optimal solution that is consequently obtained for the high frequency line of the optical modulator employing the open drain coupling configuration or the open collector coupling configuration according to the first embodiment of the present disclosure.

FIG. 13 shows an EO response of an optimal solution that is consequently obtained for the high frequency line of the optical modulator employing the open drain coupling configuration or the open collector coupling configuration according to the first embodiment of the present disclosure. For reference, it is shown that the impedance $Z_S$ of the input end is 1000Ω, and each of the impedance $Z_a$ of the input high frequency line, the impedance $Z_{MZ}$ of the optical modulation high frequency line, the impedance $Z_b$ of the output high frequency line, and the impedance $Z_L$ of the termination resistor is 30Ω. The result in FIG. 13 shows that an EO band is considerably extended by applying the present disclosure.

By using the present disclosure, even though an impedance discontinuous point occurs on the high frequency line due to a structural problem such as wiring, it is possible to obtain an optimal solution by incorporating the impedance discontinuous point into optimization calculation as a fixed one.

In the first embodiment, a description has been made of an example in which both of the input high frequency line 103 and the output high frequency line 105 are divided into segments, but a reflection characteristic and an EO response characteristic can be improved even though optimization is performed by dividing only one of the input high frequency line 103 and the output high frequency line 105 into segments.

Second Embodiment

Figure 15:
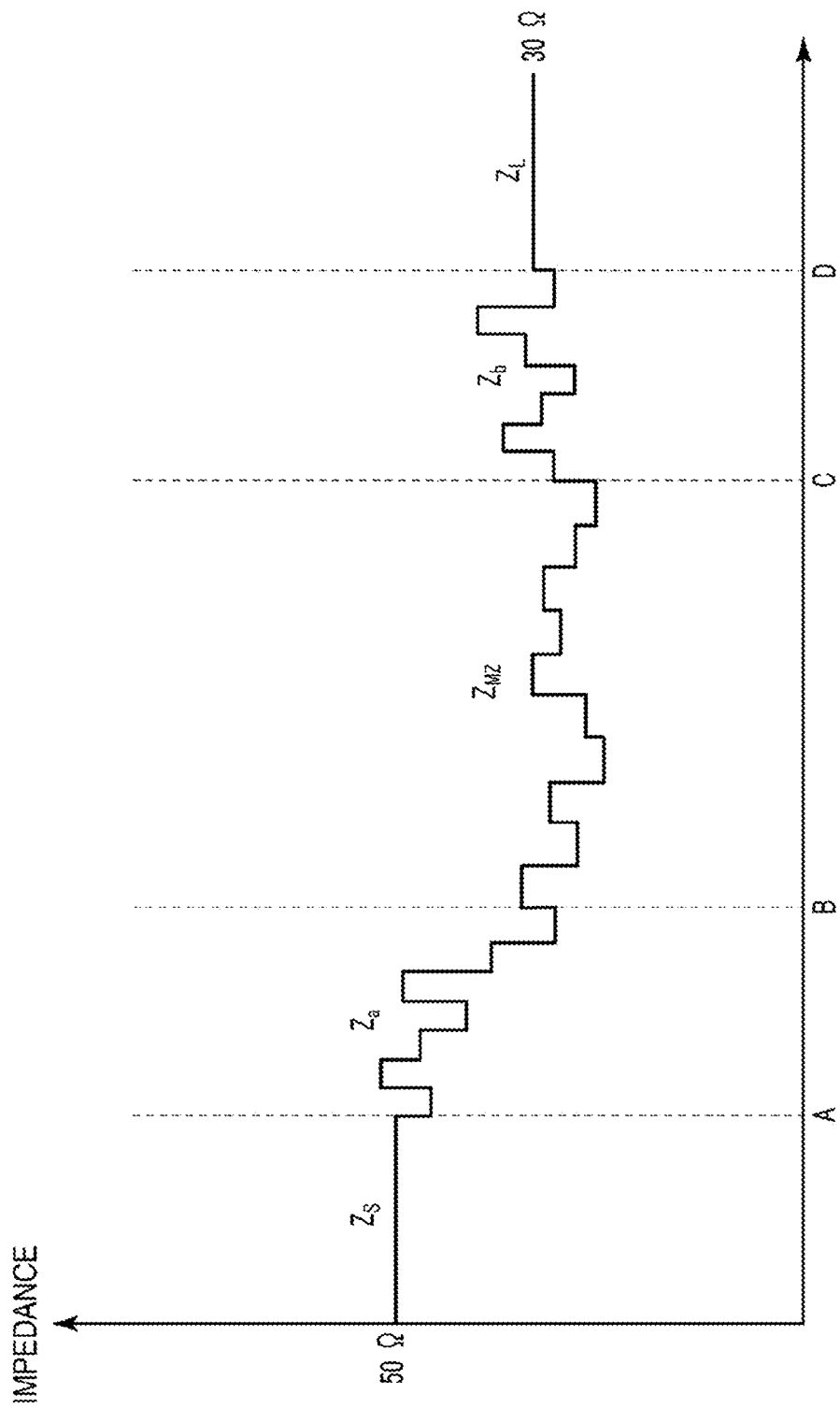
FIG. 15 is a graph showing a characteristic impedance of a high frequency line of the optical modulator according to the second embodiment of the present disclosure.

FIG. 15 shows a characteristic impedance of a high frequency line of an optical modulator according to a second embodiment of the present disclosure. In the first embodiment, a description has been made of an example in which the input high frequency line 103 and the output high frequency line 105 are divided into segments, but, in the present embodiment, the optical modulation high frequency line 104 is also divided into segments. FIG. 15 illustrates an example in which each of the input high frequency line 103 and the output high frequency line 105 is divided into 7 segments, and the optical modulation high frequency line 104 is divided into 10 segments.

Specifically, a total length of each of the input high frequency line 103 and the output high frequency line 105 was 1.5 mm, a length of the optical modulation high frequency line 104 was 3.0 mm, a length of a unit segment of the input high frequency line 103 and the output high frequency line 105 was 100 μm, and a length of a unit segment of the optical modulation high frequency line 104 was 300 μm. In other words, the input high frequency line 103 and the output high frequency line 105 was divided into 15 segments, and the optical modulation high frequency line 104 was divided into 10 segments.

Figure 14:
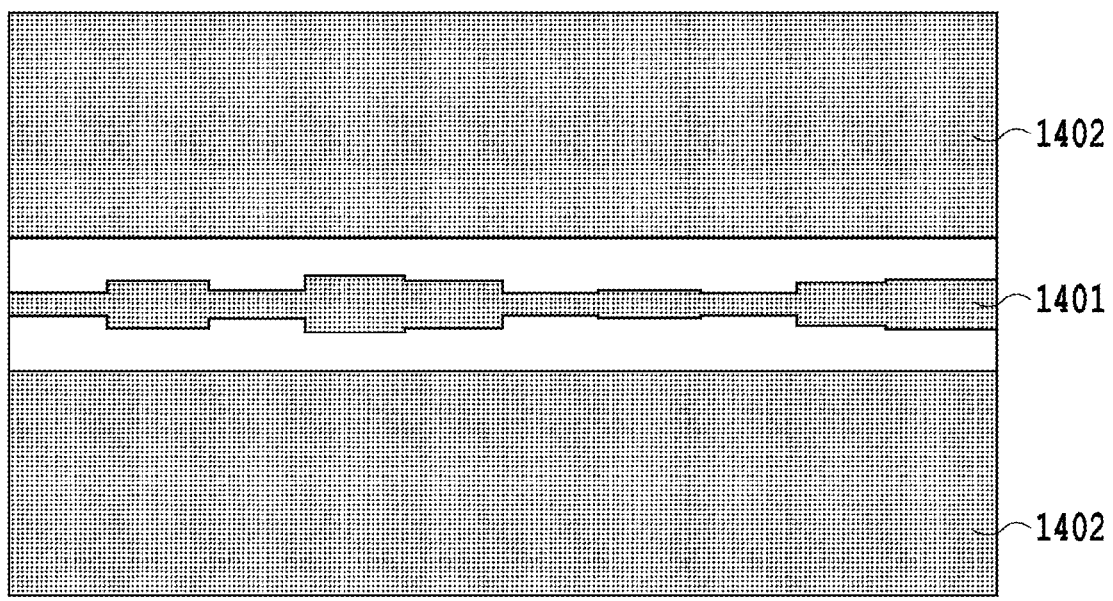
FIG. 14 is a top view illustrating an optical modulation high frequency line of an optical modulator according to a second embodiment of the present disclosure.

The impedance $Z_S$ of the input end was fixed to 50Ω, and the impedance $Z_L$ of the termination resistor was fixed to 30Ω. On the other hand, impedances of the input high frequency line 103 and the output high frequency line 105 were set to 18 values between 30Ω to 75Ω by changing a signal line width of the micro-strip line. An impedance of the optical modulation high frequency line 104 was set to 8 values between 30Ω to 40Ω by changing a width or a thickness of a signal electrode 1401 between adjacent segments such that a distance to a ground electrode 1402 is changed as illustrated in FIG. 14. A propagation constant is uniquely defined in accordance with an impedance defined by the structure. The characteristic impedances and the propagation constants may be changed by changing a width of the ground electrode 1402 such that a distance between the signal electrode 1401 and the ground electrode 1402 is changed, instead of changing the width or the thickness of the signal electrode 1401.

Optimization procedures are the same as the procedures described in the first embodiment except that the segmented optical modulation region is added as an optimization target. The evaluation value was set to a sum total of a reflection amount of S11 at each frequency and a deviation amount from 0 dB (modulation factor of 100%) of an EO response at all frequencies.

Figure 16:
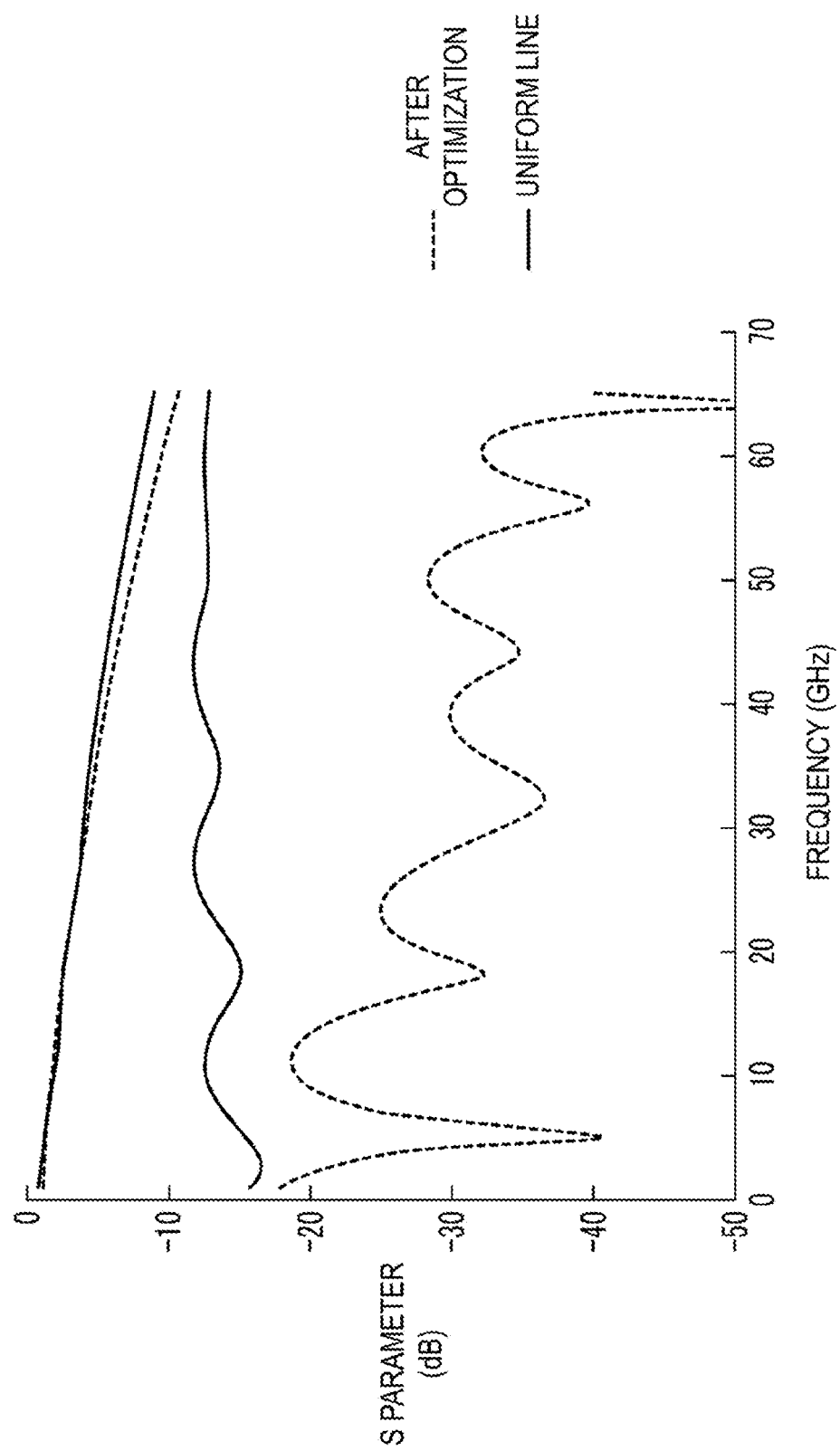
FIG. 16 is a graph showing an S parameter of an optimal solution that is consequently obtained for the high frequency line of the optical modulator according to the second embodiment of the present disclosure.
Figure 17:
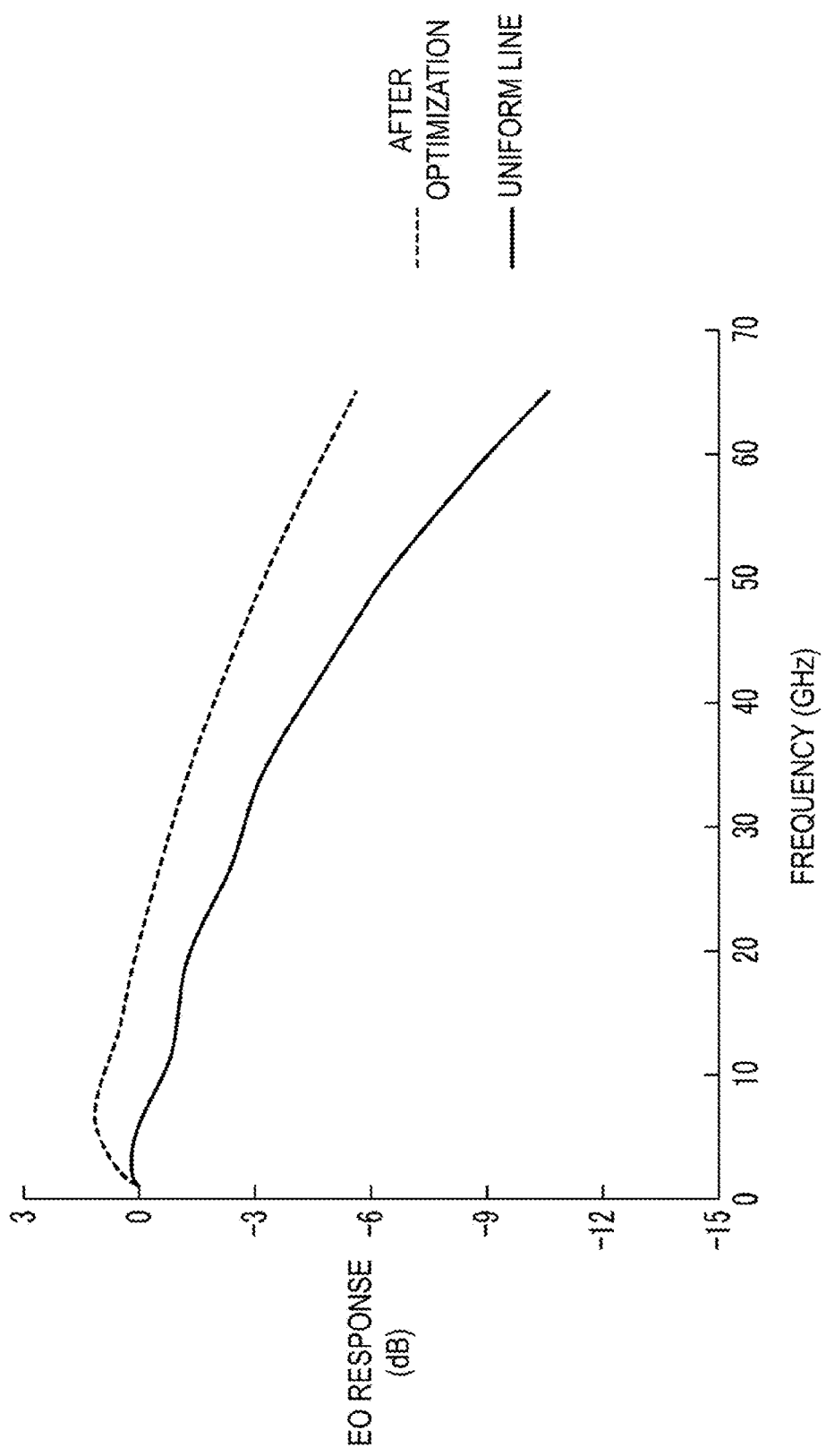
FIG. 17 is a graph showing an EO response of an optimal solution that is consequently obtained for the high frequency line of the optical modulator according to the second embodiment of the present disclosure.
Figure 18:
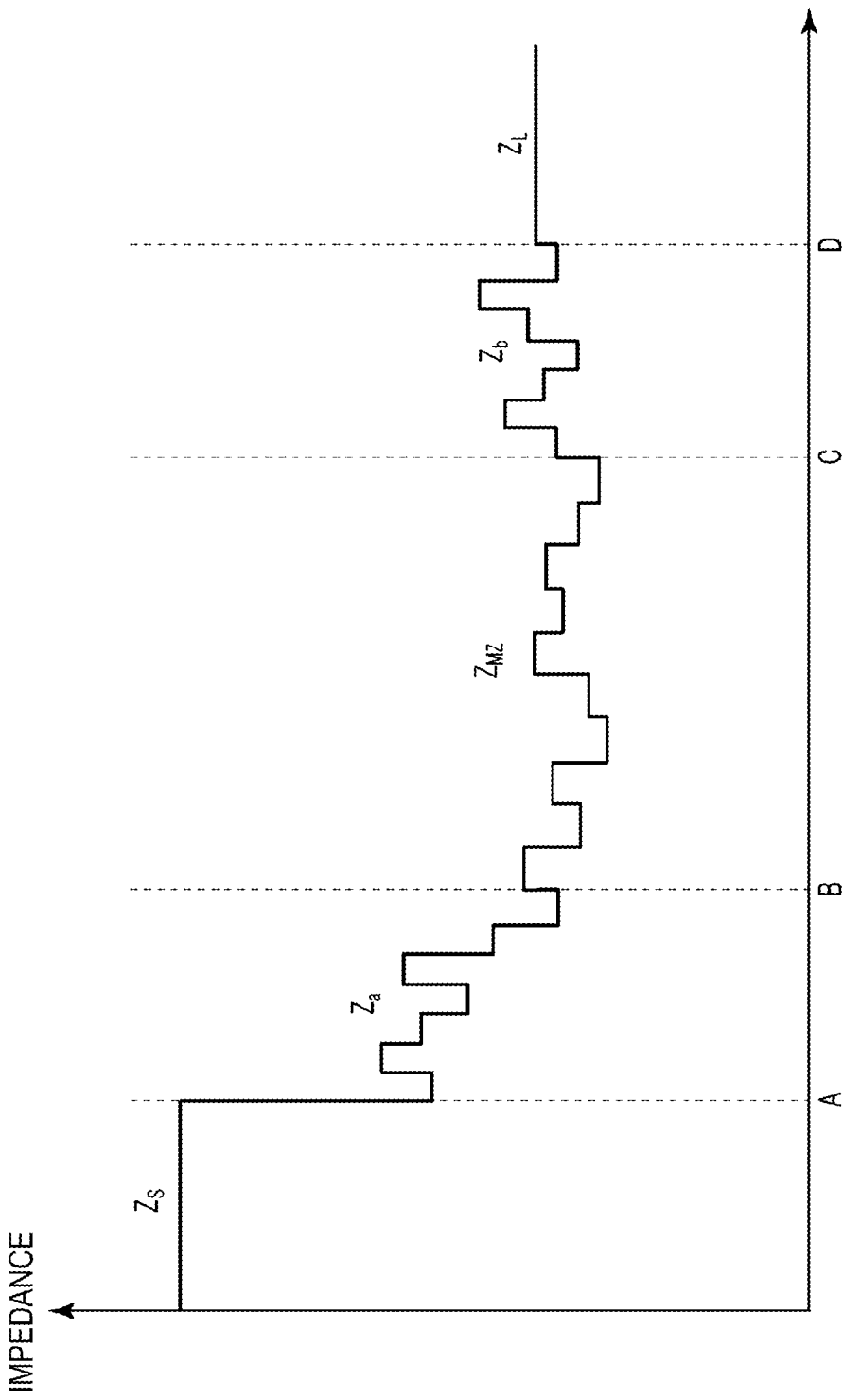
FIG. 18 is a graph showing a characteristic impedance of the high frequency line of the optical modulator employing an open drain coupling configuration or an open collector coupling configuration in coupling between a driver IC and an optical I/Q modulator according to the second embodiment of the present disclosure.

FIG. 16 to FIG. 18 respectively show an S parameter, an EO response, and a characteristic impedance of an optimal solution that is consequently obtained for the high frequency line of the optical modulator according to the second embodiment of the present disclosure. For reference, FIG. 16 and FIG. 17 also show that the impedance $Z_S$ of the input end is 50Ω, and the impedance $Z_a$ of the input high frequency line 103 is 50Ω, the impedance $Z_{MZ}$ of the optical modulation high frequency line 104 is 30Ω, the impedance $Z_b$ of the output high frequency line 105 is 30Ω, and the impedance $Z_L$ of the termination resistor 106 is 30Ω.

The result in FIG. 16 shows that reflection is remarkably suppressed in the present embodiment. Consequently, a high frequency signal from the driver IC 102 can be efficiently input. The transmission characteristic S21 of electricity deteriorates more than in the reference example on the contrary, but the result of the EO response in FIG. 17 shows that an important EO band is considerably improved in the optical modulator, and thus smooth and broadband characteristics can be realized.

Figure 19:
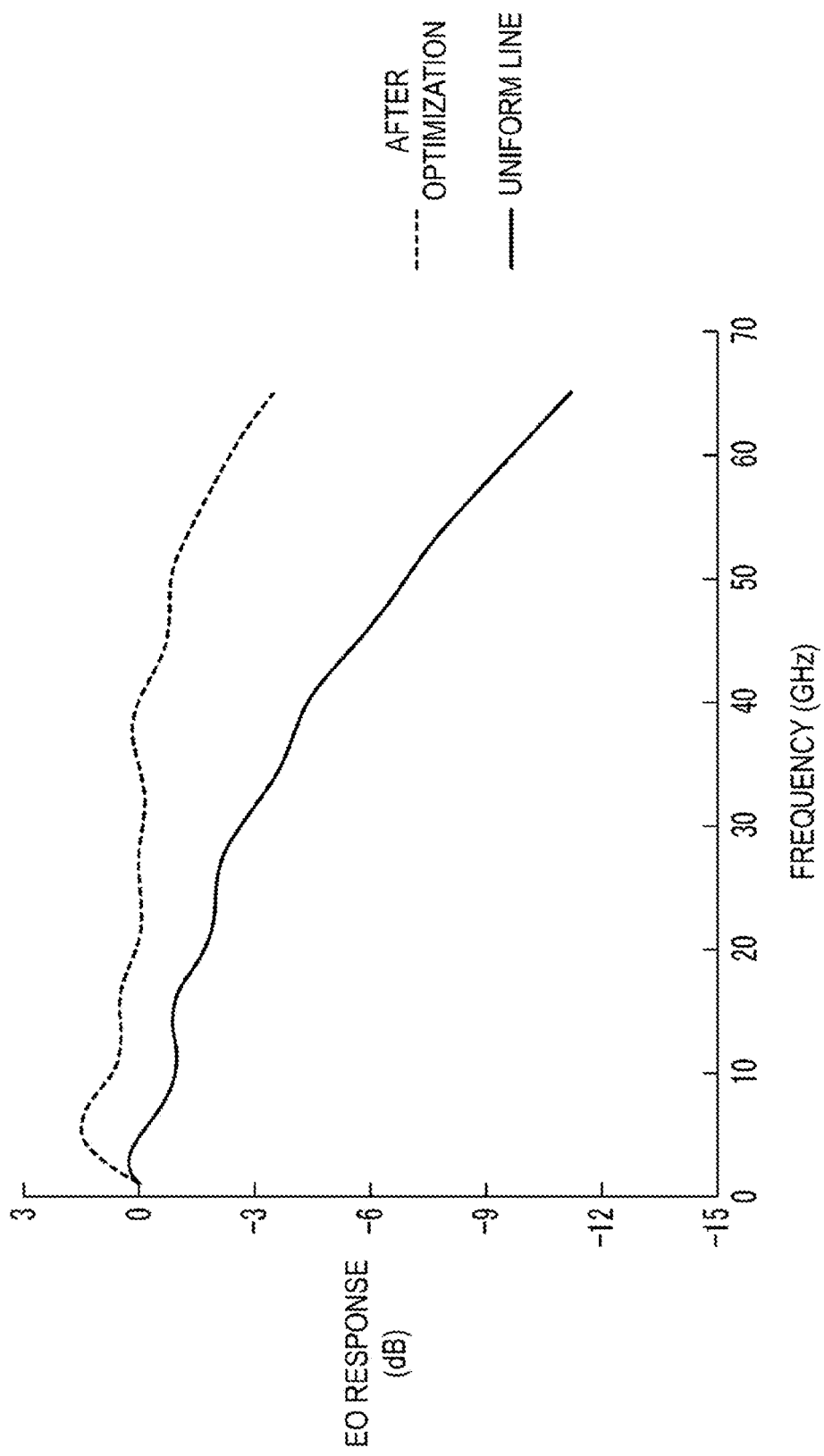
FIG. 19 is a graph showing an EO response of an optimal solution that is consequently obtained for the high frequency line of the optical modulator employing the open drain coupling configuration or the open collector coupling configuration according to the second embodiment of the present disclosure.

FIG. 18 shows a characteristic impedance of the high frequency line of the optical modulator employing an open drain coupling configuration or an open collector coupling configuration in coupling between a driver IC and an optical I/Q modulator according to the second embodiment of the present disclosure. FIG. 19 shows an EO response of an optimal solution that is consequently obtained for the high frequency line of the optical modulator employing the open drain coupling configuration or the open collector coupling configuration according to the second embodiment of the present disclosure. A comparative example illustrated as a reference has the same configuration as that of the comparative example described in the first embodiment. The result in FIG. 19 shows that an EO band is considerably extended by applying the second embodiment.

The present disclosure is not limited to the structures of the input high frequency line, the output high frequency line, and the optical modulation high frequency line described in the first and second embodiments, and may be applied to various high frequency lines such as a coplanar type high frequency line. The present disclosure is not limited to a parameter range such as the exemplified impedance, and the semiconductor optical modulator has been exemplified, but the present disclosure may be applied to an optical modulator using, for example, $LiNbO_3$ or Si.

REFERENCE SIGNS LIST

101, 301, 401 optical waveguide substrate
102 driver IC
103 input high frequency line 104 optical modulation high frequency line
105 output high frequency line
106 termination resistor
302, 402 ground electrode
303 dielectric
304, 406 signal electrode
403 lower clad layer
404 core layer
405 upper clad layer
901 dielectric
902, 1401 signal electrode
1402 ground electrode

The invention claimed is:

1. An optical modulator comprising:

high frequency lines including an optical modulation high frequency signal line that is formed to provide an electrooptic effect to an electrical signal propagating through an optical waveguide, and an input high frequency line and an output high frequency line that are coupled to the optical modulation high frequency signal line, wherein the optical modulation high frequency signal line, the input high frequency line, and the output high frequency line are divided into a plurality of segments, and adjacent segments within the plurality of the segments are designed to have different characteristic impedances and propagation constants from each other such that an EO band in the optical modulation high frequency signal line is greater than an EO band in an optical modulation high frequency signal line in a case where characteristic impedances and propagation constants of the plurality of segments are uniform, wherein the characteristic impedances of the plurality of segments of the input high frequency line and the output high frequency line are set to vary between 75 ohms and 30 ohms.

2. An optical modulator comprising:

high frequency lines including an optical modulation high frequency signal line that is formed to provide an electrooptic effect to an electrical signal propagating through an optical waveguide, and an input high frequency line and an output high frequency line that are coupled to the optical modulation high frequency signal line, wherein the optical modulation high frequency signal line, the input high frequency line, and the output high frequency line are divided into a plurality of segments, and adjacent segments within the plurality of the segments are designed to have different characteristic impedances and propagation constants from each other such that a reflection characteristic in an input end of the input high frequency line is smaller than a reflection characteristic in an input end of an input high frequency line in a case where characteristic impedances and propagation constants of the plurality of segments are uniform, wherein the characteristic impedances of the plurality of segments of the input high frequency line and the output high frequency line are set to vary between 75 ohms and 30 ohms.

3. The optical modulator according to claim 1,
wherein the high frequency lines divided into the plurality of segments is designed such that at least one of a width or a thickness of the optical modulation high frequency signal line of the high frequency line differs between adjacent segments within the plurality of the segments.

4. The optical modulator according to claim 1,
wherein the high frequency line divided into the plurality of segments is designed such that an inter-electrode distance between a signal electrode and a ground electrode differs between adjacent segments within the plurality of the segments.

5. The optical modulator according to claim 1,
wherein the high frequency line divided into the plurality of segments is designed such that a dielectric constant of a dielectric between a signal electrode and a ground electrode differs between adjacent segments within the plurality of the segments.

6. The optical modulator according to claim 2,
wherein the high frequency lines divided into the plurality of segments is designed such that at least one of a width or a thickness of the optical modulation high frequency signal line of the high frequency line differs between adjacent segments within the plurality of the segments.

7. The optical modulator according to claim 2,
wherein the high frequency line divided into the plurality of segments is designed such that an inter-electrode distance between a signal electrode and a ground electrode differs between adjacent segments within the plurality of the segments.

8. The optical modulator according to claim 2,
wherein the high frequency line divided into the plurality of segments is designed such that a dielectric constant of a dielectric between a signal electrode and a ground electrode differs between adjacent segments within the plurality of the segments.

* * * * *